O. PETERMANN.

TYPE WRITING MACHINE.

APPLICATION FILED DEC. 1, 1916.

Reissued Feb. 25, 1919.

14,599.

3 SHEETS—SHEET 1.

Witness

Chas. L. Eichhauer

Inventor

Otto Petermann

By Criswell & Davis

Attorneys

O. PETERMANN.
TYPE WRITING MACHINE.
APPLICATION FILED DEC. 1, 1916.
Reissued Feb. 25, 1919.
14,599.
3 SHEETS—SHEET 2.
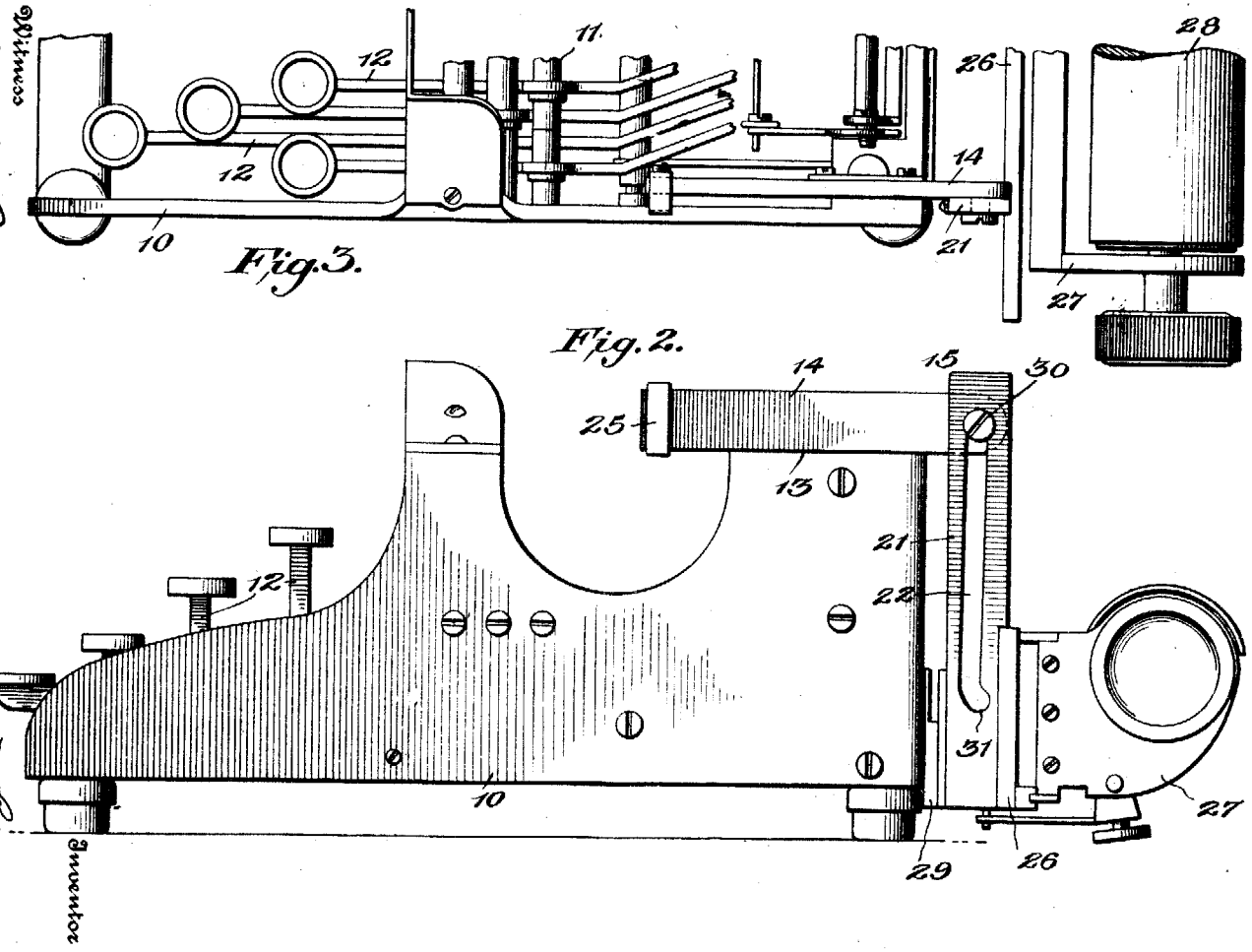
Witness
Chas. L. Griesbauer
Inventor
Otto Petermann
By Crawford & Davis
Attorneys

O. PETERMANN.

TYPE WRITING MACHINE.

APPLICATION FILED DEC. 1, 1916.

Reissued Feb. 25, 1919.

14,599.

3 SHEETS—SHEET 3.

Witness

Chas. L. Grieshauer

Inventor

Otto Petermann

By Crosnell & Davis

Attorneys

UNITED STATES PATENT OFFICE.

OTTO PETERMANN, OF GROTON, NEW YORK, ASSIGNOR TO CORONA TYPEWRITER COMPANY, INCORPORATED, A CORPORATION OF NEW YORK.

TYPE-WRITING MACHINE.

14,599. Specification of Reissued Letters Patent. Reissued Feb. 25, 1919.

Original application filed September 15, 1910, Serial No. 582,213. Renewed September 29, 1914, Serial No. 864,191. Original No. 1,121,034, dated December 15, 1914. Application for reissue filed December 1, 1916. Serial No. 134,523.

*To all whom it may concern:*

Be it known that I, OTTO PETERMANN, a citizen of the United States, and a resident of Groton, county of Tompkins, and State of New York, have invented certain new and useful Improvements in Type-Writing Machines, of which the following is a full, clear, and exact description.

This invention relates more particularly to a visible, front-stroke typewriter in which the carriage is adapted to be moved or shifted into compact relation to another part of the machine when not in use.

The main object of this invention is to provide simple means whereby the carriage and platen may be shifted into compact relation to another part of the machine and at the rear thereof, instead of forwardly, so that the height of the machine is materially reduced from that of the position assumed by the carriage when in use, thus making the machine compact and better adapted for transportation purposes.

Another object of the invention is to provide simple and efficient means whereby the carriage may be held in its normal position for use, and which may be quickly shifted into compact relation to the frame of the machine.

A further object of the invention is to provide a separable support by which the carriage may be locked when in its normal position and which may be readily released to adapt the carriage and means mounted on the support to be lowered to a plane below the upper surface of the frame of the machine.

With these and other objects in view, the invention will be hereinafter more particularly described with reference to the accompanying drawings, which form a part of this specification, and will then be pointed out in the claims at the end of the description.

In the drawings, Figure 1 is a side elevation, partly broken away and partly in section, of one form of machine embodying my invention.

Fig. 2 is a similar view to Fig. 1, except that the carriage is shown in the shifted and compact position when not in use.

Fig. 3 is a plan view of the parts in the position shown in Fig. 2.

Figure 1:
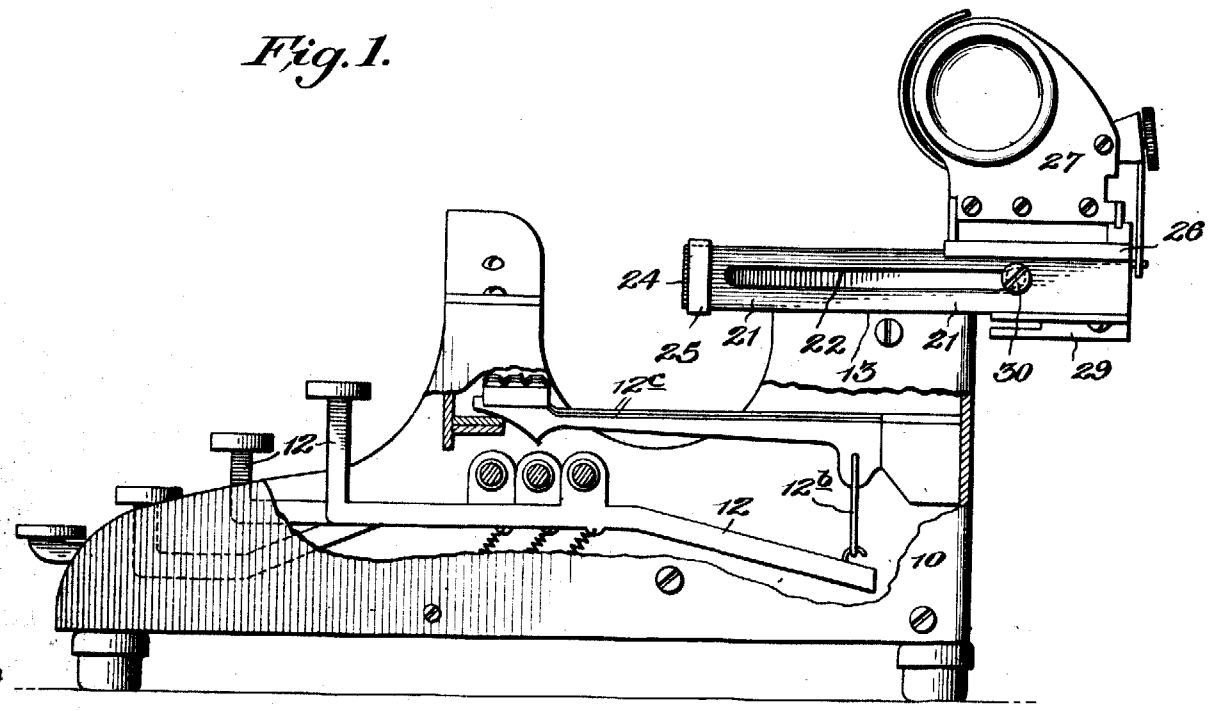

While the invention is shown as applied to a particular form of typewriting machine, it will be understood that the said invention may be applied to machines of various constructions, and that in the drawings and description only those parts of the machine are shown or referred to which assist in properly understanding the invention.

The frame 10 may be of any suitable form and extending transversely of the frame between the sides thereof are rods 11 on which they may be mounted the key-levers 12 having keys $12^a$ forming a part of a universal keyboard. These key-levers may be connected by the links $12^b$ to operate rearward and upwardly moving type-bars $12^c$ and suitable escapement mechanism, not shown, all of which may be of the usual or of any preferred construction.

The upper part of the frame may be straight, as at 13, and adapted to rest in one of its positions upon this straight portion of the frame is a member 14 of a shiftable support 15. There are two members 14 one at each side of the frame, and said members are bar-like in form and are each connected to a vertically-movable bar, slide or rod 16, which is slidingly held in a post 17 arranged at each corner of the frame. These bars 16 may be connected by a transversely extending rod, as 18, to which is held one end of an arm 19, the latter being carried by a rod 20. As the rod 20 is rocked, the arm 19 will be raised and this will serve to elevate the support 15 from the position shown in Fig. 1 to that shown in Fig. 4, the said rod 20 being connected with any suitable form of shift mechanism by which the same may be moved, though any means may be employed to elevate or to shift the support instead of that shown.

A bar-like member 21 is held to each member 14 of the support and these members are adapted to slide lengthwise of the members and are held thereto in such a way that when the members 14 are elevated, the said members 21 will also have a similar movement.

Figure 4:
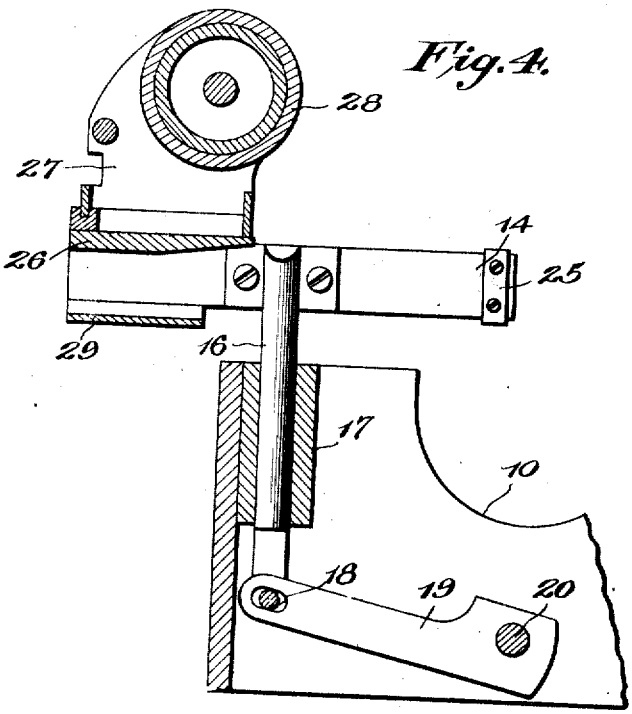
Fig. 4 is a longitudinal section of a part of the machine, showing the platen and carriage in an elevated position.
Figure 5:
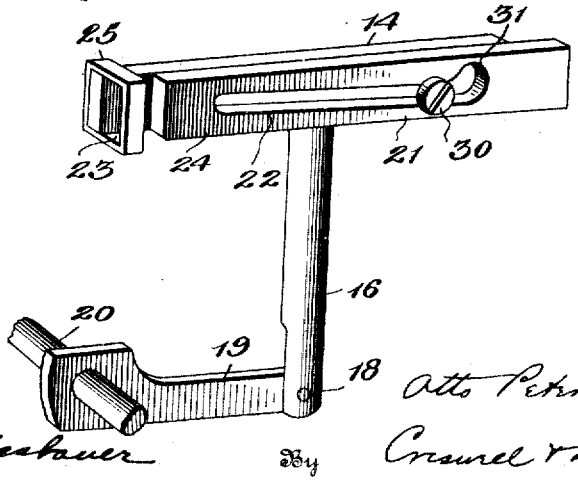
Fig. 5 is a partial perspective view, showing how the ends of parts of the shiftable support may be held together and one means for elevating the same.

Each member 21 is provided with a slot 22 extending lengthwise thereof and has its outer end adapted to fit into an opening, as 23, corresponding in size and shape to the end 24 of each member 21 and this opening is formed by a band-like device, clip or bracket 25 secured to the inner end of each of the members 14 and projecting to one side thereof. When the members 21 are moved or shifted to enter the opening 23 of the device 25, the said members 14 and 25 are held together and will move in unison so that the said support may be properly moved by the platen shift mechanism to adapt upper and lower case type as well as figures to be employed as is usual in typewriting machines. The members 21 of the support have the carriage bed 26 secured thereto and mounted to move lengthwise of said bed is a carriage 27 on which is mounted a platen 28 in any suitable manner and under the carriage bed and the supporting members 21 is a plate 29. The slot 22 of each member has a screw, pin or fastening device 30 passing therethrough, one end of which screw is held to the member 14 and the other end has its head large enough to hold the member 21 to its coöperating member 14. The shank of each screw serves as a guide or runner for the member 21 and as a pivot therefor, and each slot inclines downwardly and has a recessed or deflected portion, as 31, at one end so that when the members 21 are forced inward, as shown in Figs. 1 and 4, the shank of the screws 30 will enter said recessed parts 31 which will serve to prevent the accidental rearward movement of the arms 21, but which will permit rearward movement of the arms by slightly raising the members 21.

As will be seen when the members 21 are released from the clip or device 25, the screws or fastening devices 30 will serve as pivots for the arms or members 21, so that the carriage, platen and parts mounted on the bed or supporting members 21 may be folded downwardly to the position shown in full lines in Figs. 2 and 3. In this position, the height of the machine is materially reduced and the carriage and platen are moved rearwardly into compact relation to the frame and until the protecting plate 29 engages the rear thereof, thus better adapting the machine for transportation purposes and also permitting the work sheet to be moved to a position where it cannot be readily seen or the matter thereon read if it is desired that this be done. It will also be seen that the arms may be readily shifted into parallel relation with the members 14 of the support in order that the platen may be made to assume its normal position for printing purposes, and to present the appearance of a large machine.

From the foregoing, it will be seen that simple and efficient means are provided whereby the platen, carriage and other parts may be moved or shifted into compact relation with another part of the machine; that simple means are provided whereby the carriage may be positively held in its normal position or that in which the platen is in position for writing purposes; and that said carriage when in its normal position is adapted to be shifted in such a way that each of the type-heads may be made to have several characters thereon.

Having thus described my invention, I claim as new and desire to secure by Letters Patent:—

1. In a typewriter, the combination with a frame, of a support having a plurality of members, certain of which have a slidable relative movement with respect to the others from the front toward the rear of the machine and adapted to be pivotally held at the end of such sliding movement only to swing downward and rearwardly, and a carriage mounted upon the slidable members to adapt the carriage to be moved into compact relation to another part of the machine when not in use.

2. In a typewriter, the combination with a frame, of a support having a plurality of members, certain of which have a slidable relative movement with respect to the others from the front toward the rear of the machine and carrying pivoting means therewith to limit such sliding movement and to permit the members to swing downward and rearwardly, and a carriage mounted upon the slidable members to adapt the carriage to be moved into compact relation to another part of the machine when not in use.

3. In a typewriting machine, the combination of a vertically movable support, a carriage located above the support in its normal position, and means whereby the carriage may be moved rearwardly and downwardly away from its normal working position and entirely below the top of the frame into compact relation to another part of the machine when not in use.

4. In a typewriting machine, the combination of a movable support, a carriage, and means whereby the carriage may be moved rearwardly and downwardly below the top of the frame with the support from its normal working position into compact relation to another part of the machine when not in use.

5. In a typewriting machine, the combination of a frame, a movable support, a carriage located above the support in its normal position, and means whereby the carriage may be rearwardly moved to a point entirely below the upper surface of the frame and into compact relation to another part of the machine when not in use.

6. In a typewriter, the combination with a frame, of a two-part support, key-operated type, a platen mounted on said support and normally in the path of the type, and means whereby the platen and a part of the support may be moved rearwardly and downwardly entirely below the upper part of the frame away from the path of the type and into compact relation to the rear part of the frame when not in use.

7. In a typewriter, the combination with a frame, of a vertically movable support, a platen mounted on said support and located above the same when in use, and means whereby the platen may be folded rearwardly and downwardly below the top of the frame into compact relation to another part of said frame when not in use.

8. In a typewriter, the combination with a frame, of a carriage normally supported above the frame when in use, and means for moving the carriage below the top of the frame into compact relation to another part of the typewriter when not in use.

9. In a typewriter, the combination with a frame, of a two-part support, a carriage mounted on one part of the support, and means whereby the carriage may be moved rearwardly and downwardly with one part of the support entirely below the top of the frame and into compact relation to the rear of the frame when not in use and the other part of said support being adapted to rest directly on the frame in one of its normal positions.

10. In a typewriter, the combination with a frame, of a support having a plurality of members certain of which are horizontally movable with relation to the others and adapted to be pivotally supported at the end of such movement, devices for holding the members together in one of their positions, and a carriage mounted on the slidingly and pivotally supported members.

11. In a typewriter, the combination with a frame, of a support, said support having slidingly and pivotally held members, a bed carried by the pivotally held members, a carriage movable along the bed, a platen mounted in the carriage, and means whereby the platen may be held above the frame when in its normal position and may be shifted rearwardly and downwardly into compact relation to another part of the machine when not in use.

12. In a typewriter, the combination with a frame, of a support, means for vertically moving said support, said support having relatively movable members, a carriage, a platen mounted in the carriage, and means whereby the carriage may be held above the frame when in its normal position and may be shifted downwardly and rearwardly into compact relation to another part of the machine when not in use.

13. In a typewriter, the combination with a frame having a substantially straight upper edge, a support having members adapted to rest upon said edge in one of their positions, means for vertically elevating said support, members pivotally and slidingly held on said first-mentioned members and adapted to be moved rearwardly and downwardly at the rear of the frame, a carriage mounted on the shiftable members, and a platen held to the carriage.

14. In a typewriter, the combination with a frame having a substantially straight upper edge, a support having members adapted to rest upon said edge in one of their positions, members pivotally and slidingly held on said first-mentioned members and adapted to be moved rearwardly and downwardly at the rear of the frame, a carriage mounted on the shiftable members and a platen held to the carriage.

15. In a typewriter, the combination with a frame, having a substantially straight upper edge, of a horizontally arranged bar-like member adapted to rest along the upper edge of the frame at each side thereof, a holding device held at one end of each member, a fastening device carried by each member, relatively movable bar-like members having a longitudinally extending slot through which the fastening devices pass and which coöperate with the first mentioned members, said relatively movable members having one end adapted to be engaged by the holding devices and having their slots deflected at one end to serve to hold said members in substantially parallel relation when in normal position, means for shifting the arms when in their normal position, a carriage movable on said arms, and a platen mounted in said carriage, whereby said carriage may be shifted rearwardly and moved downward below the upper surface of the frame and into compact relation thereto.

16. In a typewriter, the combination with a frame having a substantially straight upper edge, of a horizontally arranged bar-like member adapted to rest along the upper edge of the frame at each side thereof, band-like holding devices held at one end of said members, a fastening device carried by each member, relatively movable bar-like members having longitudinally extending slots through which the fastening devices pass to slidingly and pivotally hold the members together, said relatively movable members having one end adapted to be engaged by the holding devices and having their slots deflected at one end to serve to hold the arms in substantially parallel relation when in normal position, a carriage movable on said arms, and a platen mounted in said carriage.

17. In a typewriter, the combination with a frame, of a support having horizontally arranged members, members slidingly and pivotally held to the first-mentioned members and adapted to be shifted rearwardly and downwardly thereon, and a carriage mounted on the second arms and shiftable therewith.

18. In a typewriter, the combination of a frame, a horizontally arranged bar-like member located at each side thereof, a holding device held at one edge, a screw forming a fastening device carried by each member, relatively movable bar-like members having a longitudinally extending slot through which the fastening devices pass and which coöperate with the first-mentioned members, said relatively movable members having one end adapted to be engaged by the holding devices and having their slots deflected at one end to serve to hold the arms in substantially parallel relation when in normal position, and a carriage movable on said relatively movable members.

19. In a typewriter, the combination with a frame, of a two-part support having four bar-like members, two of which are slidingly and pivotally held to the others, band-like holding devices held to two of the members and adapted to engage the ends of the others, and a carriage mounted on said slidingly and pivotally held members.

20. In a front-strike typewriting machine, the combination of a frame, keys, type-operatively connected to the keys, a vertically movable carriage located above the frame in its normal position, the platen mounted in said carrier, and means whereby the carriage may be moved rearward and downwardly to a point entirely below the upper surface of the frame out of the path of movement of the type and into compact relation to another part of the machine when not in use.

21. In a visible typewriting machine, the combination of a frame, keys, type operatively connected to the keys, a carriage located above the frame in its normal position, a platen mounted in said carriage, and means whereby the carriage may be moved rearward to a point entirely below the upper surface of the frame out of the path of movement of the type and into compact relation to another part of the machine when not in use and without disturbing the relation between the type and keys.

22. In a front-strike typewriting machine, the combination of a frame, key-levers forming a part of a universal keyboard, type-bars operatively connected to the key-levers, a carriage support having a plurality of members, certain of which have a slidable relative movement with respect to the others from the front toward the rear of the machine and carrying pivoting means therewith to limit such sliding movement and to permit the members to swing rearward and downwardly, and a carriage mounted upon the slidable members to adapt the carriage to be moved into compact relation to another part of the machine and out of the path of movement of the type-bars without disturbing the relation of the type-bars and key-levers.

23. In a front-strike typewriting machine, the combination of a frame, key-levers forming a part of a universal keyboard, type-bars operatively connected to the key-levers, a vertically movable carriage support also having a slidable movement along the frame from the front to the rear of the machine, means to permit the support to swing rearward and downwardly, and a carriage mounted upon the support to adapt the carriage to be moved below the top of the frame into compact relation to another part of the machine when the machine is not in use and out of the path of movement of the type-bars without disturbing the relation of the type-bars and key-levers.

24. In a front-strike typewriting machine, the combination of a frame, keys forming a part of a universal keyboard, type operatively connected to the keys, a vertically movable carriage support mounted on the frame to have a movement rearward and downwardly, and a carriage mounted upon the support to adapt the carriage to be moved to an abnormal position into compact relation to another part of the machine below the top of the frame and out of the path of movement of the type.

25. In a front-strike typewriting machine, the combination of a frame, key-levers, type-bars operatively connected to the key-levers, a vertically movable carriage support having a movement from the front to the rear of the machine, means to permit the support to swing rearward and downwardly, and a carriage mounted upon the support to adapt the carriage to be moved to an abnormal position into compact relation to another part of the machine out of the path of movement of the type-bars without disturbing the relation between the type-bars and the key-levers.

26. A compactible typewriting machine comprising a main frame carrying key-levers and type-bars and a support adapted to carry a platen-carriage and bed normally above the type-bars and in the rear thereof, said support embodying means to permit the carriage and its bed to be moved rearwardly and downwardly into compact position in the rear of the main frame, said means embodying devices whereby when the carriage and its support are returned to normal, working, position above the type-bars said support will be automatically locked in said normal, working, position.

27. A compactible typewriting machine comprising a main frame carrying key-bars and a support carrying a platen carriage, and means for slidably connecting the support to the frame to permit fore and aft relative sliding action during the act of compacting the machine as well as during the act of positioning the parts for use and to permit the platen carriage to be placed at the rear of the relatively stationary main frame when not in use.

28. A compactible typewriting machine comprising a main frame carrying key bars and type bars, and a support carrying a platen carriage above the type bars and in the rear thereof, and means for connecting said support to said frame to permit the carriage and its support to be moved rearwardly and downwardly into a compact position in the rear of the type bars and main frame and in horizontal alinement with the main frame.

29. A compactible typewriting machine comprising a base frame part carrying keys and type bars, a carriage bed, a platen carriage mounted thereon, means for supporting the carriage bed and platen carriage above the base frame part and in the rear of the type bars, said means comprising arms connected to the bed and means connecting said arms to the base frame part, said arms and the connections thereof permitting the platen carriage and the carriage bed to be moved rearwardly and downwardly at the rear of the base frame part to reduce the height of the machine.

30. A compactible typewriting machine comprising a base frame part, key levers mounted in the said frame part, type bars mounted in said frame part and connected at their rear ends to the rear ends of the key levers and pivoted to swing upwardly and rearwardly, a carriage bed, a platen carriage mounted thereon, means for supporting the carriage bed and platen carriage above the base frame part and in the rear of the type bars, said means comprising arms connected to the bed and to the base frame part, said arms permitting the platen carriage and the carriage bed to be moved rearwardly and downwardly at the rear of the base frame part and type bars when not in use to reduce the height of the machine and increase its fore-and-aft length.

31. A compactible typewriting machine comprising a base frame part, key levers mounted in the said frame part, type bars mounted in said frame part and connected at their rear ends to the rear ends of the key levers and pivoted to swing upwardly and rearwardly, a carriage bed, a platen carriage mounted thereon, means for supporting the carriage bed and platen carriage above the base frame part and in the rear of the type bars said means comprising arms connected to the bed and to the base frame part, said arms permitting the platen carriage and the carriage bed to be moved rearwardly and downwardly to a position at the rear of the base frame part and type bars when not in use to reduce the height of the machine, and means for locking said arms to hold the carriage bed and platen in their upper, operative positions.

32. In a compactible typewriting machine, a main frame carrying the key mechanism and the printing devices, a support carrying a platen and carriage, and means adapting the support to maintain the platen above the main frame when in writing position and to be moved to a compact, non-writing, position behind the main frame, said means embodying bars having slots, and headed pins working in said slots, the rear ends of said slots having upturned extensions for engagement with said pins to lock the support when it is adjusted to normal, writing, position.

33. In a typewriting machine, the combination of a main frame carrying the printing instrumentalities, a platen and platen-carriage, means for supporting the same above the rear end of said main frame in writing position, said supporting means embodying devices whereby the platen and carriage may be moved rearwardly and downwardly to a non-writing position behind the main frame for convenience in packing the machine, and devices whereby when the platen and carriage are restored to normal, writing, position the parts may be rigidly locked in said position.

34. In a typewriting machine, the combination of a main frame carrying the printing instrumentalities, a platen and platen-carriage, means for supporting the same above the rear end of said main frame, said supporting means embodying devices whereby the platen and carriage may be moved rearwardly and downwardly to a point behind the main frame for convenience in packing the machine, and a gravitating lock device for locking the parts when returned to writing position.

35. In a typewriting machine, the combination of a main frame carrying the printing instrumentalities, a carriage-bed supporting a platen and carriage, and means for holding the carriage-bed and its parts above the rear end of the main frame in writing position and permitting the same to be moved rearwardly and downwardly to a non-writing position behind the main frame and held suspended in that position.

36. In a typewriting machine, the combination with a main frame carrying the printing instrumentalities, of a carriage-bed supporting a platen-carriage and platen, and means for holding the platen-carriage in normal, writing, position above the rear end of the main frame and permitting it to be swung rearwardly and downwardly to a position behind said main frame in substantial fore-and-aft alinement therewith, said means embodying a member at each side of the main frame having a vertical swinging movement with respect to said main frame during the compacting movement as well as during the return movement.

37. In a typewriting machine, the combination with a main frame carrying the printing instrumentalities, of a carriage-bed supporting a platen-carriage and platen, and means for holding the platen-carriage in normal, writing, position above the rear end of the main frame and permitting it to be swung rearwardly and downwardly to a position behind said main frame in substantial fore-and-aft alinement therewith, said means embodying a member at each side of the main frame having a vertical swinging movement with respect to said main frame during the compacting movement as well as during the return movement, said members serving as the sole means of support of the carriage when the same is in non-writing position.

OTTO PETERMANN.

DISCLAIMER.

Reissue No. 14,599.—*Otto Petermann*, Groton, N. Y. TYPE-WRITING MACHINE. Patent dated February 25, 1919. Disclaimer filed October 10, 1922, by the assignee *Corona Typewriter Co. Inc.*

Hereby disclaims claims 4, 21, 26, 28, 29, 33, 34, 36, and 37 of the said Reissue Letters Patent No. 14,599, the said claims reading as follows:

"4. In a typewriting machine, the combination of a movable support, a carriage, and means whereby the carriage may be moved rearwardly and downwardly below the top of the frame with the support from its normal working position into compact relation to another part of the machine when not in use.

"21. In a visible typewriting machine, the combination of a frame, keys, type operatively connected to the keys, a carriage located above the frame in its normal position, a platen mounted in said carriage, and means whereby the carriage may be moved rearward to a point entirely below the upper surface of the frame out of the path of movement of the type and into compact relation to another part of the machine when not in use and without disturbing the relation between the type and the keys.

"26. A compactable typewriting machine comprising a main frame carrying key-levers and type-bars and a support adapted to carry a platen-carriage and bed normally above the type-bars and in the rear thereof, said support embodying means to permit the carriage and its bed to be moved rearwardly and downwardly into compact position in the rear of the main frame, said means embodying devices whereby when the carriage and its support are returned to normal, working, position above the type-bars said support will be automatically locked in said normal, working, position.

"28. A compactable typewriting machine comprising a main frame carrying key bars and type bars, and a support carrying a platen carriage above the type bars and in the rear thereof, and means for connecting said support to said frame to permit the carriage and its support to be moved rearwardly and downwardly into a compact position in the rear of the type bars and main frame and in horizontal alinement with the main frame.

"29. A compactable typewriting machine comprising a base frame part carrying keys and type bars, a carriage bed, a platen carriage mounted thereon, means for supporting the carriage bed and platen carriage bed above the base frame part and in the rear of the type bars, said means comprising arms connected to the bed and means connecting said arms to the base frame part, said arms and the connections thereof permitting the platen carriage and the carriage bed to be moved rearwardly and downwardly at the rear of the base frame part to reduce the height of the machine.

"33. In a typewriting machine, the combination of a main frame carrying the printing instrumentalities, a platen and platen-carriage, means for supporting the same above the rear end of said main frame in writing position, said supporting means embodying devices whereby the platen and carriage may be moved rearwardly and downwardly to a non-writing position behind the main frame for convenience in packing the machine, and devices whereby when the platen and carriage are restored to normal, writing, position the parts may be rigidly locked in said position.

"34. In a typewriting machine, the combination of a main frame carrying the printing instrumentalities, a platen and platen-carriage, means for supporting the same above the rear end of said main frame, said supporting means embodying devices whereby the platen and carriage may be moved rearwardly and downwardly to a point behind the main frame for convenience in packing the machine, and a gravitating lock device for locking the parts returned to writing position.

"36. In a typewriting machine, the combination with a main frame carrying the printing instrumentalities, of a carriage-bed supporting a platen-carriage and platen, and means for holding the platen-carriage in normal, writing, position above the rear end of the main frame and permitting it to be swung rearwardly and downwardly to a position behind said main frame in substantial fore-and-aft alinement therewith, said means embodying a member at each side of the main frame having a vertical swinging movement with respect to said main frame during the compacting movement as well as during the return movement.

"37. In a typewriting machine, the combination with a main frame carrying the printing instrumentalities, of a carriage-bed supporting a platen-carriage and platen, and means for holding the platen-carriage in normal, writing, position above the rear end of the main frame and permitting it to be swung rearwardly and downwardly to a position behind said main frame in substantial fore-and-aft alinement therewith, said means embodying a member at each side of the main frame having a vertical swinging movement with respect to said main frame during the compacting movement as well as during the return movement, said members serving as the sole means of support of the carriage when the same is in non-writing position."

[*Official Gazette October 24, 1922.*]